United States Patent [19]

Conte et al.

[11] 4,312,512

[45] Jan. 26, 1982

[54] CYLINDER HEAD GASKET FOR INTERNAL COMBUSTION ENGINES

[76] Inventors: Jean-Francois Conte, 22 bis rue Alberic Pont, Lyon 5°, Rhone; Henri Carles, Les Paris, Loisieux, Savoie, both of France

[21] Appl. No.: 113,322

[22] Filed: Jan. 18, 1980

[30] Foreign Application Priority Data

Jan. 18, 1979 [FR] France .................. 79 01855

[51] Int. Cl.³ .......................... F16J 15/08
[52] U.S. Cl. .................. 277/235 B; 277/166; 277/236
[58] Field of Search ........... 277/235 R, 235 B, 235 A, 277/236, 166, 233, 234

[56] References Cited

U.S. PATENT DOCUMENTS 1,840,147  1/1932  Woolson .................. 277/235 B X
2,681,241  6/1954  Aukers ................... 277/235 B X

FOREIGN PATENT DOCUMENTS 922452  1/1955  Fed. Rep. of Germany ...... 277/234

Primary Examiner—Robert S. Ward, Jr.
Attorney, Agent, or Firm—Remy J. VanOphem

[57] ABSTRACT

A cylinder gasket having three flat metal foils connected together. The fluid passages between the cylinder head and engine block are sealed by forming a centrally located first aperture in the two external flat metal foils. A smaller second aperture, centrally located to the first aperture, is formed in the central flat metal foil so as to form first and second flat zones. In the preferred embodiment, an elastomer band is attached to the central flat metal foil around the periphery of the second aperture and the first and second flat zones to seal the fluid passages. The cylinder lining is sealed by a second ring member with an external round lip. The second ring member is mounted in a third aperture in the two external flat metal foils centrally located with the cylinder lining. The external round lip is sandwiched between the two external flat metal foils and a fourth aperture in the central flat metal foil which is centrally located with the third aperture. An escape channel is provided to vent gases to the exterior of the engine. In an alternate embodiment, a C shaped circular member is attached to the central flat metal foil around the periphery of the second aperture. A metal ring is interposed the C shaped circular member and first ring member.

11 Claims, 6 Drawing Figures

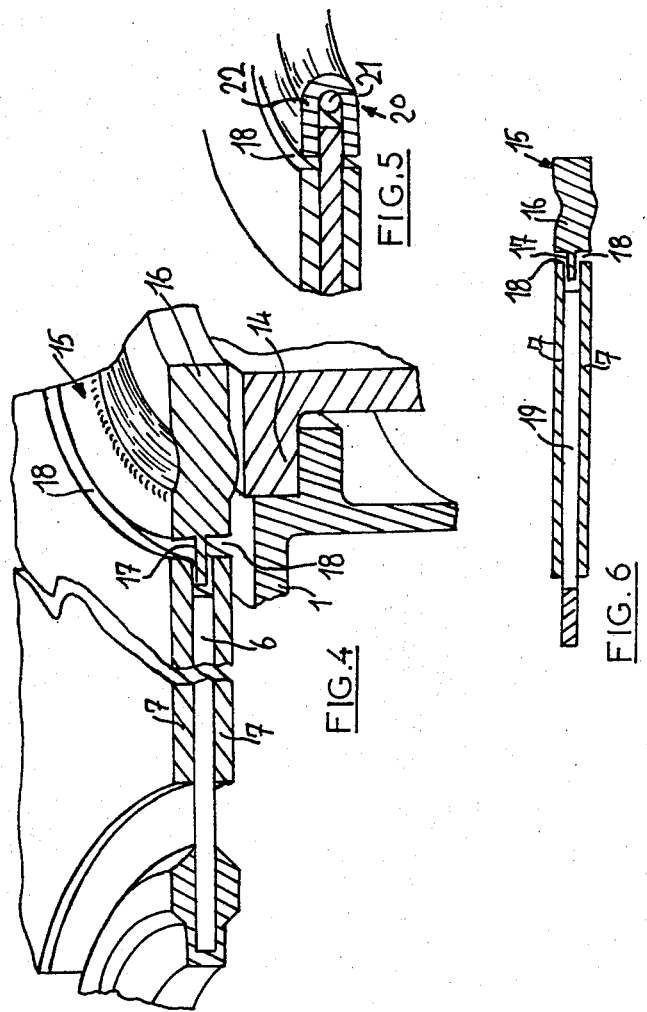

CYLINDER HEAD GASKET FOR INTERNAL COMBUSTION ENGINES

FIELD OF THE INVENTION

The present invention concerns an improved cylinder head gasket for internal combustion engines.

BACKGROUND OF THE INVENTION

Certain known cylinder head gaskets used in internal combustion engines with several cylinders, mainly in diesel engines, are essentially a metal foil with bands of elastomer attached to the foil to ensure water and oil tightness around the corresponding water and oil passage openings, and components embedded or set in the metal foil to ensure gas tightness around the cylinders.

One of the disadvantages inherent in these known gaskets lies in that, taking account of the width of the elastomer bands attached to the edge of the metal foil, the different passage openings must remain relatively distant from one another, which complicates the manufacture of a cylinder head.

In addition, the collection of gas leaks which are inevitably produced around the flanges of the cylinder linings is difficult to bring about, and it is necessary to provide a gas-leak exhaust channel by means of special machining.

SUMMARY OF THE INVENTION

The present invention has the aim of achieving an improved cylinder head gasket which avoids the above disadvantages, which is of high performance, and of which the reliability is much superior to that of cylinder head gaskets achieved hitherto.

A cylinder head gasket according to the invention comprises essentially three flat metal foils held against one another, and it is characterised in that the sealing around the oil and water passage openings is achieved by means of elastomer bands attached to the central metal foil, the exterior foils stopping short of the zones of the central metal foil which carry the bands.

According to an additional characteristic of the invention, each elastomer band comprises two beads which each extend on one of the large faces of the central metal foil and which have a thickness slightly greater than that of the external metal foils.

According to an additional characteristic of the invention, in the case of two passage openings very close to one another, the external metal foils are interrupted in the zone situated just between the two passage openings in question.

According to an additional characteristic of the invention, around the flanges of the cylinder linings the central metal foil is set back from the external metal foils. Gas tightness is ensured by a metal ring having on the one hand a thick corrugated interior portion, and on the other hand a thin external portion, or lip, located between the two external metal foils. Circular escape channels are defined between the edges of the external metal foils and the outer edges of the thick interior portion of the metal ring.

According to an additional characteristic of the invention, channels are cut in the central metal foil to allow the annular escape channels provided around the cylinders to communicate with the exterior.

According to a variant of the invention, around the flanges of the cylinder linings the external metal foils are set back in relation to the central metal foil. Gas sealing is carried out by a circular component set on the central metal foil, circular escape channels being formed between the outer edges of the applied circular component and the edges of the external metal foils.

According to an additional characteristic of the invention, the circular component comprises a full metal ring adjacent to the edge of the central metal foil, and a thin circular metal band of which the central part is rolled around the ring and of which the two free edges are fitted one on each side of the central metal foil.

The attached drawings, given by way of non-limiting example, will allow the characteristics of the invention to be better understood.

BRIEF DESCRIPTION OF THE DRAWINGS

FIG. 4 is a part view of a gasket according to the invention, in perspective and in section along IV—IV of FIG. 1.

FIG. 5 is a view corresponding to FIG. 4 according to a variant.

FIG. 6 is a section VI—VI of FIG. 1.

DESCRIPTION OF THE PREFERRED EMBODIMENT

Figure 1:
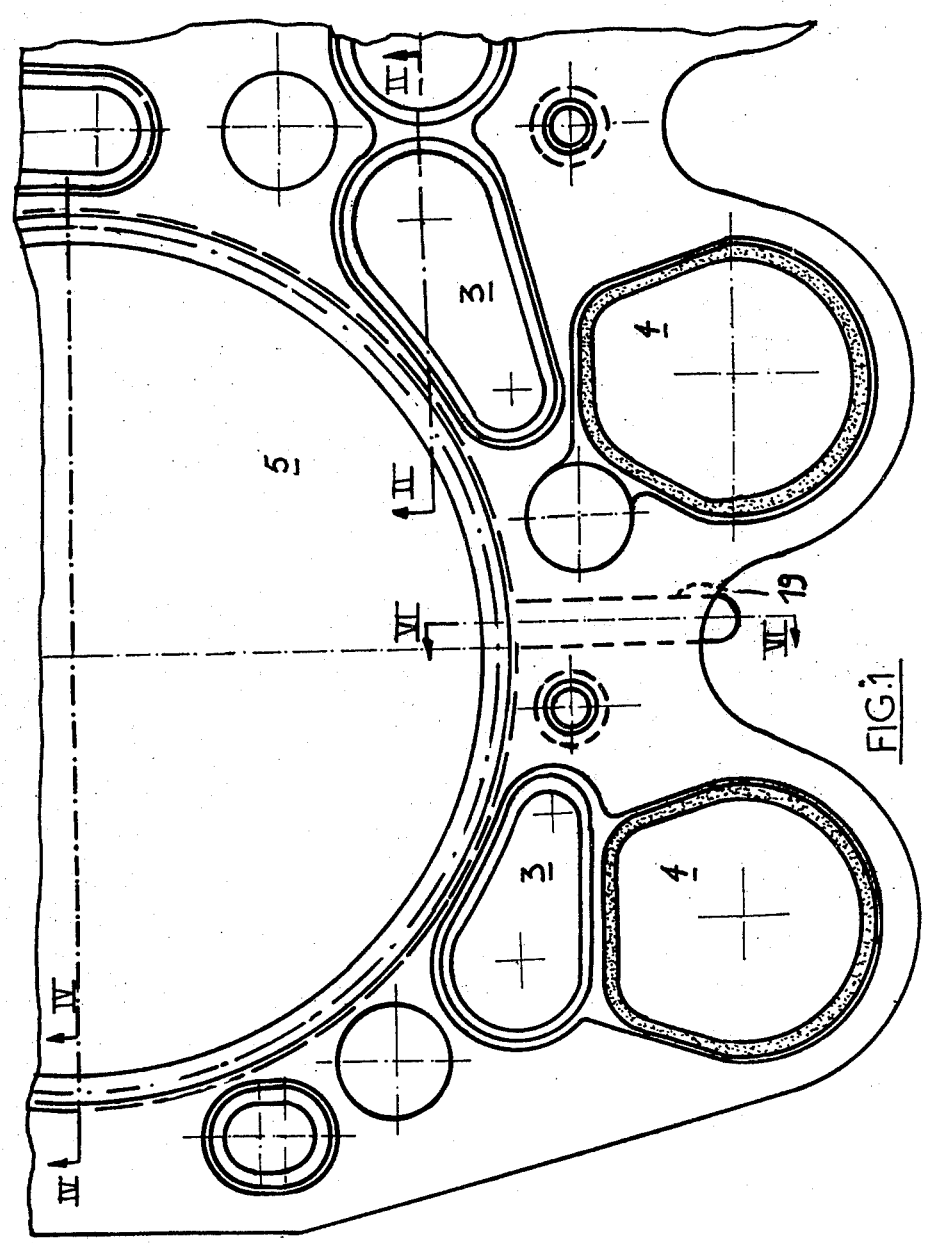
FIG. 1 is a part plan view of a cylinder head gasket according to the invention.
Figure 2:
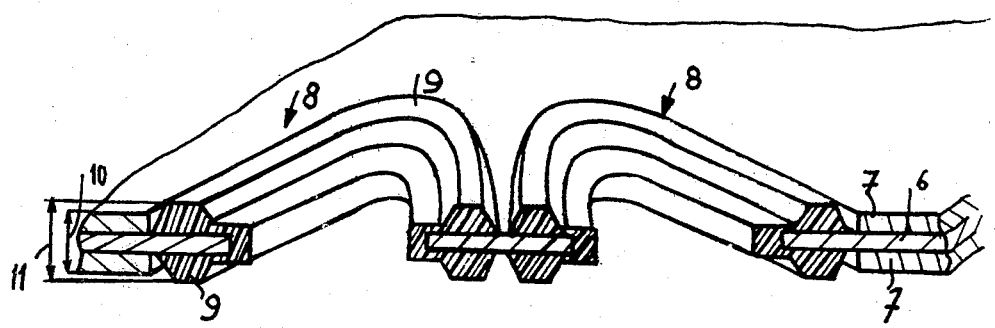
FIG. 2 is a part perspective view of this gasket, and in section along II—II of FIG. 1.

A cylinder head gasket according to the invention is shown in the drawings. This gasket is intended for fitting to an internal combustion engine, for example a diesel engine, between the engine block 1 and the cylinder head 2, to allow the various sealing operations around the water passage openings 3, the oil passage openings 4, and the cylinders 5 (FIGS. 1, 2 and 4).

In general, the gasket according to the invention is essentially constituted by three flat metal foils held one against the other, namely a central foil 6 and two external foils 7. These foils may be riveted, welded, pressed, etc. together.

Around the oil and water passage openings sealing is achieved by means of elastomer bands 8 (FIG. 2) attached to the central foil 6, the external foils 7 then stopping short of the zones of the central foil 6 which carry these bands 8. Each band 8 mainly comprises two beads 9 which each extend on one of the large faces of the central foil 6, and of which the thickness 11 is slightly greater than the thickness 10 of the external foils.

Thus, when the gasket is compressed between the upper flat surface of the engine block 1 and the lower flat surface of the cylinder head 2, the degree of compression of the bands 8 is in relation to the difference provided between the thickness 10 and 11, clamping being effected on the central foil 6 and the external foils 7 which are virtually incompressible.

Figure 3:
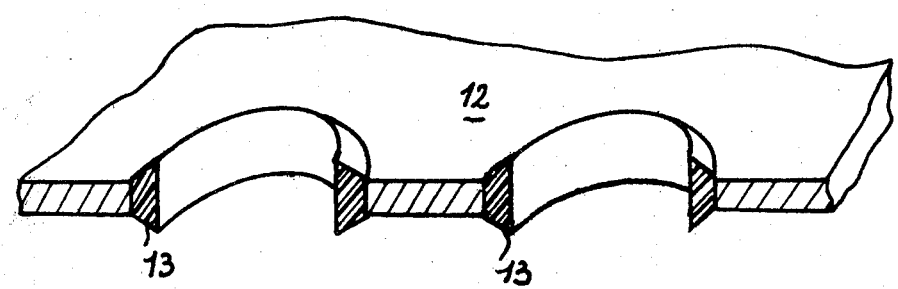
FIG. 3 is a part view of a conventionally made cylinder head gasket.

When two of the passage openings are very close together, the external metal foils are totally interrupted in the zone situated between the two passage openings in question (FIG. 2). In conventional cylinder head gaskets comprising a single metal foil 12 (FIG. 3), the elastomer bands 13 are stuck against the edge of this single foil 12, and there is therefore no question of interrupting this single foil between two adjacent openings. This demonstrates why the cylinder head gasket according to the invention allows the design of passage openings much closer together than was possible hitherto with conventional cylinder head gaskets, without thereby sacrificing strength and sealing capacity.

In a first manufactured type of cylinder head gasket according to the invention, around the flanges 14 of the cylinder linings (FIG. 4), the central foil 6 is set back in relation to the external foils 7, while gas sealing is ensured by a metal ring 15. This ring comprises on the one hand an internal thick corrugated portion 16 and on the other hand a thin external lip 17 located between the two external foils 7. Circular escape channels 18 are in addition formed between the edges of the external foils 7 and the outer edges of the thick portion 16 of the ring 15. Opposite each cylinder a channel 19 is formed simply by cutting away the central foil 6 to put the channels 18 in communication with the exterior.

The assembly is designed in such a way that the first force of the clamping occurs on the rings 15 of which the corrugated inner portion 16 is slightly deformable. Owing to the channels 18 and 19 gas leaks occurring around the rings 15 are led off directly to the exterior of the engine, thus avoiding any risk of these gases becoming mixed in the circuits of oil or water after having passed the bands 8.

According to a variant illustrated in FIG. 5, the external foils 7 are set back in relation to the central foil 6 around the flanges 14. Gas sealing is then ensured by a circular component 20 pressed on to the central metal foil 6. This circular component 20 comprises a full metal ring 21 adjacent to the edge of the central foil 6, and a thin circular band 22 of which the central part is rolled around the ring 21 and of which the two free edges are fitted one each side of the central foil 6. Here again, annular escape channels 18 are provided. These channels are arranged between the exterior edges of the circular component 20 and the edges of the external metal foils 7.

We claim:

1. A cylinder head gasket for sealing between the upper flat surface of an engine block and the lower flat surface of a cylinder head, the upper flat surface of the engine block having at least one cylinder lining and portions defining at least one first fluid passage, the lower flat surface of the cylinder head having portions defining at least one second fluid passage centrally located with said at least one first fluid passage of said engine block, said head gasket comprising:

two external flat metal foils, each of said two external flat metal foils having a top surface and an opposite surface, said top surface of one of said two external flat metal foils mounted adjacent to the lower flat surface of the cylinder head, said opposite surface of another of said two external flat metal foils mounted adjacent to the upper flat surface of the engine block, each of said two external flat metal foils further having at least one first aperture centrally located with said at least one first and second fluid passages;

a central flat metal foil having a top portion attached to said opposite surface of one of said two external flat metal foils and a bottom portion attached to said top surface of another of said two external flat metal foils, said two external foils and said central foil further being integrally connected to form an integral flat body member, said central flat metal foil further having at least one second aperture centrally located with respect to said at least one first aperture of each of said two external flat metal foils to permit flow communication between said at least one first fluid passage and said at least one second fluid passage, said at least one first aperture of each of said two external flat metal foils further being larger than said at least one second aperture forming a first flat zone on said top portion of said central flat metal foil between said at least one first aperture and said at least one second aperture and a second flat zone on said bottom portion of said central flat metal foil between said at least one first aperture and said at least one second aperture; and means attached to said central flat metal foil around the periphery of said at least one second aperture for sealing said at least one first and said at least one second fluid passages so as to prevent the loss of fluid between said at least one first passage in said cylinder block and said at least one second passage in said cylinder head.

2. A cylinder head gasket, as claimed in claim 1, wherein said sealing means further comprises:

a compressible elastomer band mounted to said central metal foil around the periphery of said at least one second aperture.

3. A cylinder head gasket, as claimed in claim 2, wherein said sealing means further comprises:

a circular member mounted adjacent but spaced away from the periphery of said at least one second aperture of said central metal foil, said circular member having a first circular band and a second circular band attached to said first circular band to form a C shaped circular member, said first circular band mounted contiguous to said first flat zone and said second circular band mounted contiguous to said second flat zone; and a first ring member interposed said circular member and the periphery of said at least one second aperture of said central metal foil.

4. A cylinder head gasket, as claimed in claim 3, further comprising:

means for providing flow communication between said at least two external metal foils and said circular member.

5. A cylinder head gasket, as claimed in claim 1, wherein each of said two external flat metal foils further having at least one third aperture centrally located with said at least one cylinder lining, said central flat metal foil further having at least one fourth aperture centrally located with said at least one third aperture of each of said two external flat metal foils, said at least one fourth aperture of said central metal foil further being larger than said at least one third aperture in each of said two external flat metal foils, said head gasket further comprising:

a second ring member mounted contiguous to said at least one cylinder lining, said second ring member having a central circular body portion and a external round lip mounted to the periphery of said central circular body portion, said central circular body portion located within said at least one fourth aperture of said central flat metal foil and said at least one third aperture of each of said two external flat metal foils to form an escape channel therebetween, said external lip mounted in said at least one fourth aperture and mounted contiguous to said opposite surface of one of said two external flat metal foils and to said top surface of another of said two external flat metal foils; and means for providing flow communication between said escape channel and the exterior of the engine.

6. A cylinder head gasket, as claimed in claim 2, wherein said integral flat body member has a first predetermined thickness and wherein said compressible elastomer band has two beads, one of said two beads secured to said first flat zone and another of said two beads secured to said second flat zone, each of said two beads having an apex, said apex of said one of said two beads projecting from said first flat zone and said another of said two beads projecting from said second flat zone so as to project a second predetermined thickness, said second predetermined thickness further being greater than said first predetermined thickness so as to permit compressing said compressible elastomer band to seal said at least one first and second passage when the cylinder head is clamped to the engine block.

7. A cylinder head gasket, as claimed in claim 5, wherein said central circular body portion is deformable.

8. A cylinder head gasket, as claimed in claim 1, wherein said two external flat metal foils and said central flat metal foil are incompressible.

9. A cylinder head gasket, as claimed in claim 1, wherein said two external flat metal foils and said central flat metal foil are weldably connected.

10. A cylinder head gasket, as claimed in claim 1, wherein said two external flat metal foils and said central flat metal foil are rivetably connected.

11. A cylinder head gasket, as claimed in claim 1, wherein said two external flat metal foils and said central flat metal foil are compressibly connected.

* * * * *